United States Patent
Kita (10) Patent No.: US 10,319,407 B2
(45) Date of Patent: *Jun. 11, 2019

(54) SIGNAL CONVERSION DEVICE, PROCESSING DEVICE, COMMUNICATION SYSTEM, AND SIGNAL CONVERSION METHOD

(71) Applicant: LAPIS SEMICONDUCTOR CO., LTD., Kanagawa (JP)

(72) Inventor: Yukihiro Kita, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,086

(22) Filed: Apr. 2, 2018

(65) Prior Publication Data

US 2018/0226099 A1    Aug. 9, 2018

Related U.S. Application Data

(63) Continuation of application No. 15/632,766, filed on Jun. 26, 2017, now Pat. No. 9,959,899.

(30) Foreign Application Priority Data

Jul. 1, 2016    (JP) .................................. 2016-131928

(51) Int. Cl.
*H03M 5/10*    (2006.01)
*G11B 20/10*    (2006.01)
(Continued)

(52) U.S. Cl.
CPC .... *G11B 20/10037* (2013.01); *G11B 15/1875* (2013.01); *G11B 27/005* (2013.01);
(Continued)

(58) Field of Classification Search
CPC ............ G11B 20/10037; G11B 27/005; G11B 27/3027; G11B 15/1875; G04L 25/0278;
(Continued)

(56) References Cited

U.S. PATENT DOCUMENTS 4,201,909 A    5/1980 Dogliotti et al.
4,249,266 A    2/1981 Nakamori
(Continued)

FOREIGN PATENT DOCUMENTS

JP    2015219980 A    12/2015

*Primary Examiner* — Jean B Jeanglaude
(74) *Attorney, Agent, or Firm* — Volentine, Whitt & Francos, PLLC (57) ABSTRACT

A signal conversion device includes a first converting section configured to convert a clock signal input through a first signal line, a data signal input through a second signal line, and a control signal input through a third signal line, into pulse signals including a first pulse train and a second pulse train; and a transmitting section configured to transmit the first pulse train through a fourth signal line and the second pulse train through a fifth signal line, wherein the control signal is a signal that, through a level transition, causes a control target device to switch between an active state and an inactive state, and wherein the first converting section is configured to put successive pulses into at least one of the first pulse train and the second pulse train in response to the level transition of the control signal.

15 Claims, 6 Drawing Sheets

(51) Int. Cl.
    *G11B 15/18*    (2006.01)
    *G11B 27/00*    (2006.01)
    *G11B 27/30*    (2006.01)
    *H04B 3/14*     (2006.01)
    *H04L 25/02*    (2006.01)

(52) U.S. Cl.
    CPC ......... *G11B 27/3027* (2013.01); *H04B 3/141* (2013.01); *H04L 25/0272* (2013.01); *H04L 25/0278* (2013.01)

(58) Field of Classification Search
    CPC .. H04B 3/41; H03M 7/00; H03M 5/00; G06F 5/00
    USPC ....................................... 341/50, 51, 55, 100
    See application file for complete search history.

(56) References Cited

U.S. PATENT DOCUMENTS

| | | |
|---|---|---|
| 4,530,088 A | 7/1985 | Hamstra et al. |
| 8,155,533 B2 | 4/2012 | Nakamoto |
| 9,196,183 B2 | 11/2015 | Hwang |
| 9,686,020 B2 | 6/2017 | Mochizuki et al. |
| 2006/0280260 A1 | 12/2006 | Dally |
| 2007/0258513 A1 | 11/2007 | Strzalkowski |
| 2009/0196335 A1 | 8/2009 | Huang et al. |
| 2012/0275527 A1 | 11/2012 | Douglass |
| 2013/0272366 A1 | 10/2013 | Dally |
| 2015/0103945 A1 | 4/2015 | Maehata |

SIGNAL CONVERSION DEVICE, PROCESSING DEVICE, COMMUNICATION SYSTEM, AND SIGNAL CONVERSION METHOD

CROSS-REFERENCE TO RELATED APPLICATION

This application is a continuation application of application Ser. No. 15/632,766, filed on Jun. 26, 2017, now U.S. Pat. No. 9,959,899 issued on May 1, 2018, which claims priority under 35 USC 119 from Japanese Patent Application No. 2016-131928, filed on Jul. 1, 2016, the disclosure of which is incorporated by reference herein.

BACKGROUND

Technical Field

Technology disclosed herein relates to a signal conversion device, a processing device, a communication system, and a signal conversion method.

Related Art

A known battery monitoring system monitors the state of each battery cell in an assembled battery that is configured by plural battery cells connected in series. This battery monitoring system is, for example, configured including a processing device that measures a voltage or the like of each battery cell; a control device that issues various instructions to the processing device, such as an instruction to read measurement data; and a transmission line that connects the control device and the processing device. With regards to methods of communication between the processing device and the control device in a battery monitoring system thus configured, the following technologies are known.

United States Patent Application Publication (US) No. 2012/0275527, for example, describes converting standard Serial Peripheral Interface (SPI) signals into pulse signals at a transmitting side, and converting the pulse signals into standard SPI signals at a receiving side. At the transmitting side, a chip select signal configuring the SPI signal is converted into a pulse signal having a comparatively large pulse width, and a data signal latched using a clock edge is converted into a pulse signal having a comparatively small pulse width. At the receiving side, the pulse signal with the comparatively large pulse width is converted into a chip select signal, and the pulse signal with the comparatively small pulse width is converted into a data signal and a clock signal.

Japanese Patent Application Laid-Open (JP-A) No. 2015-219980 describes a system including an assembled battery control section and plural single battery control sections that are connected in series. In this system, a signal transmitted from the assembled battery control section is input to a first-stage single battery control section through an isolating element and a signal communication channel. Further, an output from the first-stage single battery control section is input to a second-stage single battery control section through the signal communication channel. Furthermore, an output from a final-stage single battery control section is transmitted to the assembled battery control section through the isolating element and the signal communication channel.

However, in the method described in US 2012/0275527, in which the chip select signal, the clock signal, and the data signal are distinguished at the receiving section using the pulse width of the pulse signals, in cases in which, for example, the pulse signals degrade while passing through the transmission line and the pulse width is altered, it is difficult to convert from the pulse signals to the original SPI signals at the receiving section. To avoid this case, the difference in pulse width between portions in the pulse signals with a long pulse width and portions in the pulse signals with a short pulse width must be large. Accordingly, the transmission time per individual data item or individual command increases. Moreover, in the above case, it is necessary to prepare two types of noise filters and waveform-shaping circuits at the receiving section: one for pulses with a large pulse width and one for pulses with a small pulse width, thus increasing cost.

SUMMARY

The present disclosure provides a signal conversion device, a processing device, a communication system, and a signal conversion method that may reduce the effect of signal degradation in a transmission line.

A first aspect of the present disclosure is a signal conversion device including: a first converting section configured to convert a clock signal input through a first signal line, a data signal input through a second signal line, and a control signal input through a third signal line, into pulse signals including a first pulse train and a second pulse train; and a transmitting section configured to transmit the first pulse train through a fourth signal line and the second pulse train through a fifth signal line, wherein the control signal is a signal that, through a level transition, causes a control target device to switch between an active state and an inactive state, and wherein the first converting section is configured to put successive pulses into at least one of the first pulse train and the second pulse train in response to the level transition of the control signal.

A second aspect of the present disclosure is a processing device including: a receiving section configured to receive the first pulse train and the second pulse train transmitted from the signal conversion device of the first aspect; a second converting section configured to convert the first pulse train and the second pulse train to the clock signal, the data signal, and the control signal; and a processing section configured to perform predetermined processing based on the clock signal, the data signal, and the control signal.

A third aspect of the present disclosure is a communication system including: a signal conversion device including a first converting section configured to convert a clock signal input through a first signal line, a data signal input through a second signal line, and a control signal input through a third signal line, into pulse signals including a first pulse train and a second pulse train, and a transmitting section configured to transmit the first pulse train through a fourth signal line and the second pulse train through a fifth signal line; and a processing device including a receiving section configured to receive the first pulse train and the second pulse train transmitted from the signal conversion device; a second converting section configured to convert the first pulse train and the second pulse train to the clock signal, the data signal, and the control signal; and a processing section configured to perform predetermined processing based on the clock signal, the data signal, and the control signal, wherein the control signal is a signal that, through a level transition, causes a control target device to switch between an active state and an inactive state, and wherein the first converting section is configured to put successive pulses into at least one of the first pulse train and the second pulse train in response to the level transition of the control signal.

A signal conversion method including: converting a clock signal input through a first signal line, a data signal input through a second signal line, and a control signal input through a third signal line into pulse signals including a first pulse train and a second pulse train, wherein the control signal is a signal that, through a level transition, causes a control target device to switch between an active state and an inactive state, and wherein successive pulses are put into at least one of the first pulse train and the second pulse train in response to the level transition of the control signal.

According to the above aspects, the present disclosure may provide a signal conversion device, a processing device, a communication system, and a signal conversion method that may reduce the effect of signal degradation in a transmission line.

BRIEF DESCRIPTION OF THE DRAWINGS

Exemplary embodiments will be described in detail based on the following figures, wherein.

DETAILED DESCRIPTION

Explanation follows regarding examples of exemplary embodiments of the present disclosure, with reference to the drawings. Note that in the drawings, configuration elements and portions that are the same or are equivalent are appended with the same reference numerals.

First Exemplary Embodiment

Figure 1:
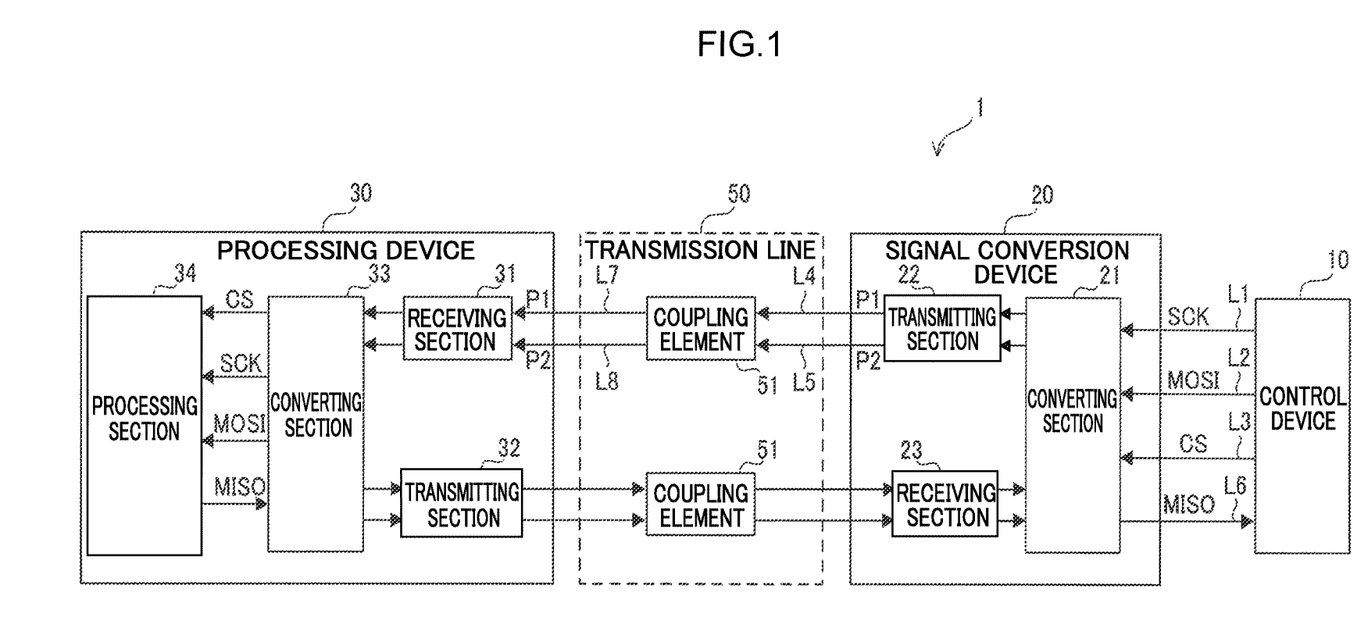
FIG. 1 is a block diagram illustrating configuration of a communication system according to an exemplary embodiment of the present disclosure.

FIG. 1 is a block diagram illustrating configuration of a communication system 1 according to an exemplary embodiment of the present disclosure. The communication system 1 is configured including a control device 10, a signal conversion device 20, a processing device 30, and a transmission line 50.

The control device 10 provides various instructions to the processing device 30 using the SPI communication method. Namely, in the SPI communication method, the control device 10 functions as the master device and the processing device 30 functions as the slave device. The control device 10 is configured by a computer including a central processing section (CPU), read-only memory (ROM), random access memory (RAM), and the like. The control device 10 issues various instructions to the processing device 30 using a clock signal SCK, a data signal MOSI, and a chip select signal CS. The control device 10 also receives a data signal MISO transmitted from the processing device 30 based on the instructions.

The clock signal SCK is a signal that controls operation timings of the processing device 30. Namely, the processing device 30 operates in synchronization with the clock signal SCK. The data signal MOSI includes an instruction for the processing device 30. In a system including plural processing devices 30, the data signal MOSI may include designation information that designates one of the plural processing devices 30. The chip select signal CS is a signal that, through a level transition, causes the processing device 30 to switch to an active state or an inactive state. In the present exemplary embodiment, transitioning the chip select signal CS to a low level switches the processing device 30 to the active state, and transitioning the chip select signal CS to a high level switches the processing device 30 to the inactive state. The processing device 30 maintains the active state while the chip select signal CS is at the low level.

The clock signal SCK, data signal MOSI, and chip select signal CS output from the control device 10 are supplied to the signal conversion device 20 through respective signal lines L1, L2, and L3. The data signal MISO is supplied to the control device 10 through a signal line L6.

The signal conversion device 20 is configured including a converting section 21, a transmitting section 22, and a receiving section 23. The converting section 21 combines and converts the clock signal SCK, data signal MOSI, and chip select signal CS input through the signal lines L1 to L3 into pulse signals composed of a first pulse train P1 and a second pulse train P2. The transmitting section 22 transmits the first pulse train P1 to a signal line L4 and transmits the second pulse train P2 to a signal line L5. The clock signal SCK, data signal MOSI, and chip select signal CS output from the control device 10 are thus converted into pulse signals composed of the first pulse train P1 and the second pulse train P2 and passed through the transmission line 50.

The transmission line 50 is a path for communication between the signal conversion device 20 and the processing device 30. The transmission line 50 includes coupling elements 51 for isolating the signal conversion device 20 and the processing device 30. The coupling elements 51 remove the direct current component of signals passing through the transmission line 50. A photocoupler, an isolator, a transformer, a capacitor, or the like can be employed for each coupling element 51. The first pulse train P1 transmitted to the signal line L4 and the second pulse train P2 transmitted to the signal line L5 are respectively relayed through one coupling element 51 to a signal line L7 and a signal line L8 and are supplied to the processing device 30.

The processing device 30 includes a receiving section 31, a transmitting section 32, a converting section 33, and a processing section 34. The receiving section 31 receives the first pulse train P1 and the second pulse train P2 input through the signal line L7 and the signal line L8 and supplies the first pulse train P1 and the second pulse train P2 to the converting section 33.

The converting section 33 converts the first pulse train P1 and the second pulse train P2 into the original clock signal SCK, data signal MOSI, and chip select signal CS. Namely, the converting section 33 performs conversion processing that is inverse to the conversion processing of the converting section 21 of the signal conversion device 20. The converting section 33 supplies the clock signal SCK, data signal MOSI, and chip select signal CS reconstructed by the conversion processing to the processing section 34.

The processing section 34 performs predetermined processing based on the clock signal SCK, data signal MOSI, and chip select signal CS supplied from the converting section 33. Namely, the processing section 34 adopts the active state due to the chip select signal CS transitioning to the low level, synchronizes with the clock signal SCK, and performs processing in accordance with the instruction included in the data signal MOSI.

The data signal MISO, which includes data acquired due to the processing section 34 performing processing in accordance with the instruction, is converted into pulse signals by the converting section 33 and supplied to the signal conversion device 20 through the transmission line 50. In the signal conversion device 20, the pulse signals supplied from the processing device 30 are received by the receiving section 23, the pulse signals are converted into the original data signal MISO by the converting section 21, and this signal is supplied to the control device 10 through the signal line L6.

Figure 2A:
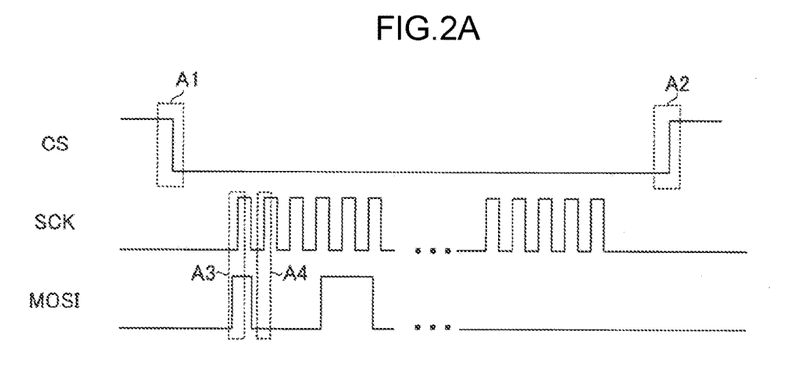
FIG. 2A is a diagram illustrating examples of a clock signal SCK, a data signal MOSI, and a chip select signal CS that confirm the SPI protocol and are input to a converting section of a signal conversion device according to an exemplary embodiment of the present disclosure.
Figure 2B:
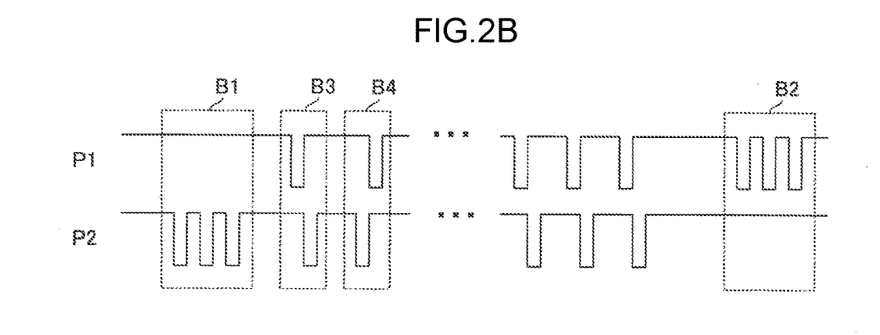
FIG. 2B is a diagram illustrating examples of a first pulse train and a second pulse train output from a converting section of a signal conversion device according to an exemplary embodiment of the present disclosure.

FIG. 2A is a diagram illustrating examples of the clock signal SCK, the data signal MOSI, and the chip select signal CS, input to the converting section 21 of the signal conversion device 20 and confirms the SPI protocol. FIG. 2B is a diagram illustrating examples of the first pulse train P1 and the second pulse train P2 output from the converting section 21 of the signal conversion device 20. Signal portion A1 in FIG. 2A corresponds to signal portion B1 in FIG. 2B, signal portion A2 in FIG. 2A corresponds to signal portion B2 in FIG. 2B, signal portion A3 in FIG. 2A corresponds to signal portion B3 in FIG. 2B, and signal portion A4 in FIG. 2A corresponds to signal portion B4 in FIG. 2B.

The converting section 21 of the signal conversion device 20 puts successive pulses in the second pulse train P2 (the signal portion B1) in response to a transition from the high level to the low level in the input chip select signal CS, namely, in response to a falling edge (the signal portion A1). The converting section 21 of the signal conversion device 20 puts successive pulses in the first pulse train P1 (the signal portion B2) in response to a transition from the low level to the high level in the input chip select signal CS, namely, in response to a rising edge (the signal portion A2). Note that successive pulses means that at least one out of a transition from the low level to the high level and a transition from the high level to the low level occurs two or more times within a predetermined period of time.

The converting section 21 of the signal conversion device 20 puts one pulse in the first pulse train P1 and then puts one pulse in the second pulse train P2 (the signal portion B3) in response to the data signal MOSI being at the high level at a timing when a rising edge occurs in the clock signal SCK (the signal portion A3). Namely, the one pulse put in the first pulse train P1 temporally precedes the one pulse put in the second pulse train P2.

The converting section 21 of the signal conversion device 20 puts one pulse in the second pulse train P2, and then puts one pulse in the first pulse train P1 (the signal portion B4) in response to the data signal MOSI being at the low level at a timing when a rising edge occurs in the clock signal SCK (the signal portion A4). Namely, the one pulse put in the second pulse train P2 temporally precedes the one pulse put in the first pulse train P1.

In the present exemplary embodiment, the pulse widths of each pulse of the successive pulses put in the first pulse train P1 and the second pulse train P2 in response to the chip select signal CS and are the same as the pulse widths of each pulse put in the first pulse train P1 and the second pulse train P2 in response to the clock signal SCK and the data signal MOSI.

The converting section 33 of the processing device 30 performs the conversion processing inverse to the conversion processing of the converting section 21 of the signal conversion device 20 to reconstruct the clock signal SCK, data signal MOSI, and chip select signal CS based on the first pulse train P1 and the second pulse train P2. Namely, the converting section 33 of the processing device 30 responds to successive pulses that have been in the second pulse train P2 to reconstruct a chip select signal CS transition from the high level to the low level, and the converting section 33 of the processing device 30 responds to successive pulses that have been in the first pulse train P1 to reconstruct a chip select signal CS transition from the low level to the high level. In cases in which at least one out of a transition from the low level to the high level and a transition from the high level to the low level is detected to have occurred two or more times in the first pulse train P1 of the second pulse train P2 within a predetermined period of time, the converting section 33 of the processing device 30 determines that successive pulses have occurred in this pulse train. Further, the converting section 33 of the processing device 30 reconstructs the clock signal SCK and the data signal MOSI based on the sequence of pulses included in the first pulse train P1 and pulses included in the second pulse train P2.

Explanation follows regarding an operation of the communication system 1. The control device 10 gives a command to the processing device 30. Namely, the control device 10 puts a command in the data signal MOSI of an SPI signal and supplies the data signal MOSI, together with the clock signal SCK and the chip select signal CS, to the signal conversion device 20. The clock signal SCK, data signal MOSI, and chip select signal CS are respectively supplied to the signal conversion device 20 through signal lines L1 to L3.

The converting section 21 of the signal conversion device 20 converts the clock signal SCK, data signal MOSI, and chip select signal CS received from the control device 10 into pulse signals composed of the first pulse train P1 and the second pulse train P2. The transmitting section 22 transmits the first pulse train P1 to the signal line L4 and transmits the second pulse train P2 to the signal line L5, to supply the pulse signals obtained through conversion processing in the converting section 21 to the processing device 30.

The first pulse train P1 and the second pulse train P2 output from the signal conversion device 20 are received by the receiving section 31 of the processing device 30 and supplied to the converting section 33. The converting section 33 converts the first pulse train P1 and the second pulse train P2 into the original clock signal SCK, data signal MOSI, and chip select signal CS, and supplies each of the signals obtained through conversion processing to the processing section 34. The processing section 34 adopts the active state in cases in which the chip select signal CS obtained through conversion processing in the converting section 33 is presented at the low level.

The processing section 34 executes processing in accordance with a command that has been included in the data signal MOSI obtained through conversion processing in the converting section 33. In cases in which the command given by the control device 10 is, for example, to read data, the processing section 34 reads data in accordance with the command and supplies the data that has been read (referred to as read data hereafter) to the transmitting section 32. The transmitting section 32 transmits the read data to the signal conversion device 20. The read data transmitted from the transmitting section 32 of the processing device 30 is transmitted to the transmission line 50 in the form of pulse signals composed of a first pulse train and a second pulse train.

The read data transmitted from the transmitting section 32 of the processing device 30 is received by the receiving section 23 of the signal conversion device 20 through the transmission line 50. The converting section 21 of the signal conversion device 20 converts the format of the received read data from the pulse signal format into the SPI signal format. The converting section 21 of the signal conversion device 20 supplies a MISO signal that includes the read data generated by the conversion processing to the control device 10.

As described above, the communication system 1 according to the above exemplary embodiment of the present disclosure converts the clock signal SCK, data signal MOSI, and chip select signal CS output from the control device 10, into pulse signals composed of the first pulse train P1 and the second pulse train P2 using the signal conversion device 20. The communication system 1 according to the present exemplary embodiment converts a chip select signal CS level transition to successive pulses in the first pulse train P1 or the second pulse train P2. Accordingly, even in cases in which the pulse signals composed of the first pulse train P1 or the second pulse train P2 degrades while passing through the transmission line 50 such that pulse width is altered, recognition of the successive pulses in the first pulse train P1 or the second pulse train P2 by the processing device 30 is easy. Namely, the communication system 1 according to the present exemplary embodiment may reduce the effect of signal degradation in the transmission line. Accordingly, in the present exemplary embodiment, the transmission time per individual data item or individual command may be shortened, compared to a case in which a chip select signal is distinguished from a clock signal and a data signal by using the pulse width of pulse signals.

Moreover, since the pulse width of each of the pulses configuring the first pulse train P1 and the second pulse train P2 are the same in the communication system 1 according to the present exemplary embodiment, noise filters and waveform-shaping circuits may be consolidated into a single type of circuit in the receiving processing device 30. Accordingly, the present exemplary embodiment may enable the processing device 30 to be configured at low cost.

Figure 2C:
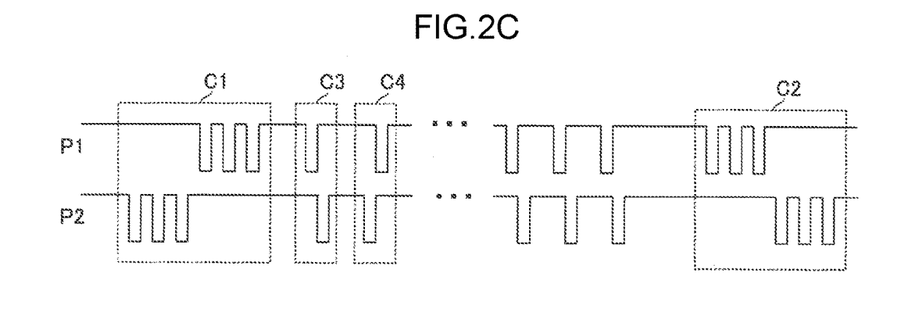
FIG. 2C is a diagram illustrating another example of a first pulse train and a second pulse train output from a converting section of a signal conversion device according to an exemplary embodiment of the present disclosure.

FIG. 2C is a diagram illustrating another example of a first pulse train P1 and a second pulse train P2 output from the converting section 21 of the signal conversion device 20. Signal portion A1 in FIG. 2A corresponds to signal portion C1 in FIG. 2C, signal portion A2 in FIG. 2A corresponds to signal portion C2 in FIG. 2C, signal portion A3 in FIG. 2A corresponds to signal portion C3 in FIG. 2C, and signal portion A4 in FIG. 2A corresponds to signal portion C4 in FIG. 2C.

The converting section 21 of the signal conversion device 20 may put successive pulses in the second pulse train P2 and then put successive pulses in the first pulse train P1 (the signal portion C1) in response to a transition from the high level to the low level in the input chip select signal CS, namely, in response to a falling edge (the signal portion A1). The converting section 21 of the signal conversion device 20 may put successive pulses in the first pulse train P1 and then put successive pulses in the second pulse train P2 (the signal portion C2) in response to a transition from the low level to the high level in the input chip select signal CS, namely, in response to a rising edge (the signal portion A2).

By respectively converting a rising edge (the signal portion A1) and a falling edge (the signal portion A2) of the chip select signal CS into pulse signals combining successive pulses in the first pulse train P1 and successive pulses in the second pulse train P2 in this manner, tolerance to noise mixed into the transmission line 50 may be further increased.

Second Exemplary Embodiment

Figure 3:
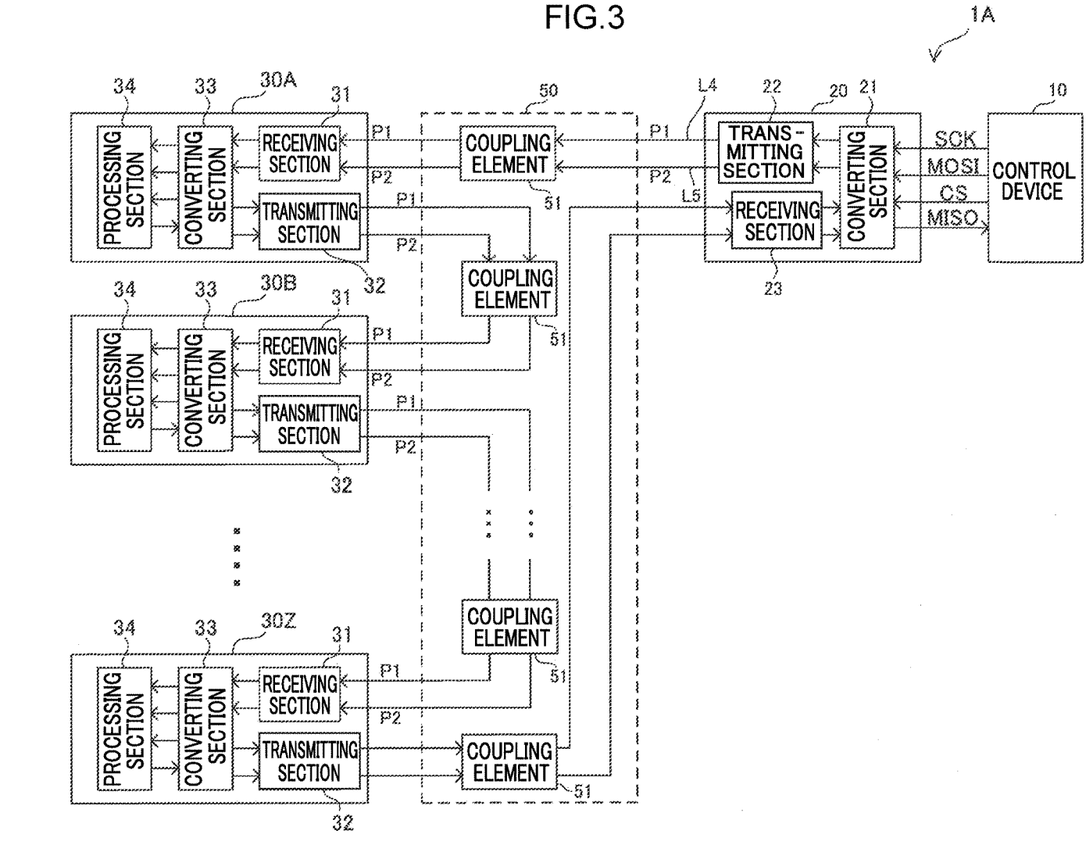
FIG. 3 is a block diagram illustrating configuration of a communication system according to alternative exemplary embodiment of the present disclosure.

FIG. 3 is a block diagram illustrating configuration of a communication system 1A according to a second exemplary embodiment of the present disclosure. The communication system 1A according to the present exemplary embodiment differs from the communication system 1 according to the first exemplary embodiment above in that it includes plural processing devices 30A, 30B, . . . , 30Z. The configuration of each of the plural processing devices 30A, 30B, . . . , 30Z is similar to that of the processing device 30 according to the first exemplary embodiment above. Each of the plural processing devices 30A, 30B, . . . , 30Z is configured including a receiving section 31, a transmitting section 32, a converting section 33, and a processing section 34.

In the plural processing devices, the transmitting sections 32 of earlier-stage processing devices are connected to the receiving sections 31 of later-stage processing devices. Namely, the plural processing devices are connected in cascade, with the processing device 30A configuring the first stage and the processing device 30Z configuring the final stage. The receiving section 31 of the first-stage processing device 30A and the transmitting section 32 of the final-stage processing device 30Z are connected to the signal conversion device 20 through the transmission line 50. Signals transmitted from the signal conversion device 20 are received by the receiving section 31 of the first-stage processing device 30A through a coupling element 51 in the transmission line 50, and signals transmitted from the transmitting section 32 of the final-stage processing device 30Z are received by the receiving section 23 of the signal conversion device 20 through a coupling element 51 in the transmission line 50. Each of the processing devices other than the first-stage processing device 30A and the final-stage processing device 30Z are connected to other adjacent processing devices through the transmission line 50. For example, signals transmitted from the transmitting section 32 of the processing device 30A are received by the receiving section 31 of the processing device 30B through a coupling element 51 of the transmission line 50.

Explanation follows regarding an operation of the communication system 1A according to the present exemplary embodiment. The control device 10 gives a command designating one of the plural processing devices 30A, 30B, . . . , 30Z. Namely, the control device 10 puts a command and designation information designating a target for executing a command in the data signal MOSI of an SPI signal, and supplies the data signal MOSI, together with the clock signal SCK and the chip select signal CS, to the signal conversion device 20. The clock signal SCK, data signal MOSI, and chip select signal CS are respectively supplied to the signal conversion device 20.

The converting section 21 of the signal conversion device 20 converts, the clock signal SCK, data signal MOSI, and chip select signal CS received from the control device 10, into pulse signals composed of the first pulse train P1 and the second pulse train P2. The transmitting section 22 transmits the first pulse train P1 to the signal line L4 and transmits the second pulse train P2 to the signal line L5 to supply the pulse signals obtained through conversion processing in the converting section 21 to the processing devices 30A to 30Z.

The first pulse train P1 and the second pulse train P2 output from the signal conversion device 20 are received by the receiving section 31 of the first-stage processing device 30A. The converting section 33 of the first-stage processing device 30A converts the first pulse train P1 and the second pulse train P2 into the clock signal SCK, data signal MOSI, and chip select signal CS, and supplies each of the signals obtained through conversion processing to the processing section 34 of the processing device 30A. In a case in which the processing section 34 of the processing device 30A has itself been designated by the designation information included in the data signal MOSI, the processing section 34 of the processing device 30A executes processing that accords with the command included in the data signal MOSI. On the other hand, in a case in which the processing section 34 of the processing device 30A has not itself been designated by the designation information included in the data signal MOSI, the processing section 34 of the processing device 30A does not execute processing that accords with the command included in the data signal MOSI. In addition, the converting section 33 of the first-stage processing device 30A supplies the first pulse train P1 and the second pulse train P2 to the transmitting section 32 of the processing device 30A as-is without any conversion. The transmitting section 32 of the processing device 30A transmits the first pulse train P1 and the second pulse train P2 to the adjacent later-stage processing device 30B.

The first pulse train P1 and the second pulse train P2 transmitted from the transmitting section 32 of the first-stage processing device 30A are received by the receiving section 31 of the later-stage processing device 30B. The converting section 33 of the processing device 30B converts the first pulse train P1 and the second pulse train P2 into the clock signal SCK, data signal MOSI, and chip select signal CS, and supplies each of the signals obtained through conversion processing to the processing section 34 of the processing device 30B. In a case in which the processing section 34 of the processing device 30B has itself been designated by the designation information included in the data signal MOSI, the processing section 34 of the processing device 30B executes processing that accords with the command included in the data signal MOSI. On the other hand, in a case in which the processing section 34 of the processing device 30B has not itself been designated by the designation information included in the data signal MOSI, the processing section 34 of the processing device 30B does not execute processing that accords with the command included in the data signal MOSI. The converting section 33 of the processing device 30B also supplies the first pulse train P1 and the second pulse train P2 to the transmitting section 32 of processing device 30B as-is without any conversion. The transmitting section 32 of the processing device 30B transmits the first pulse train P1 and the second pulse train P2 to an adjacent later-stage processing device (not illustrated in the drawings).

Thus, the first pulse train P1 and the second pulse train P2 that include the command and the designation information designating the command execution target given by the control device 10 is sequentially relayed from the first-stage processing device 30A to the final-stage processing device 30Z. Each converting section 33 of the processing devices 30A to 30Z reconstructs the original SPI signal based on the first pulse train P1 and the second pulse train P2. In each of the processing devices 30A to 30Z, the processing section 34 executes the command only in a case in which itself is designated by the designation information included in the data signal MOSI converted by the respective converting section 33 of that processing device.

In cases in which the command given by the control device 10 is, for example, to read data, the processing section 34 of the processing device designated as the command execution target out of the processing devices 30A to 30Z reads data in accordance with the command and supplies the data that has been read (referred to as read data hereafter) to the respective transmitting section 32 of that processing device. The respective transmitting section 32 of that respective processing device transmits the read data to an adjacent later-stage processing device. The read data is transmitted through the plural processing devices and to the final-stage processing device 30Z.

The final-stage processing device 30Z transmits, from its own transmitting section 32, read data that it has read by its own processing section 34 or read data that has been transmitted from an earlier-stage processing device. The read data transmitted from the transmitting section 32 of the final-stage processing device 30Z is transmitted to the transmission line 50 in the form of pulse signals composed of a first pulse train and a second pulse train.

The read data transmitted from the transmitting section 32 of the final-stage processing device 30Z is received by the receiving section 23 of the signal conversion device 20 through the transmission line 50. The converting section 21 of the signal conversion device 20 converts the format of the received read data from the pulse signal format into the SPI signal format. The converting section 21 of the signal conversion device 20 supplies a MISO signal that includes the read data generated by the conversion processing to the control device 10.

As described above, in the communication system 1A according to the present exemplary embodiment, the first-stage processing device 30A and the final-stage processing device 30Z are connected to the signal conversion device 20 through the transmission line 50. Commands given by the control device 10 are transmitted along one direction going from earlier-stage processing devices to later-stage processing devices. The read data acquired from one of the processing devices 30A to 30Z in accordance with the command given by the control device 10 is also transmitted along one direction going from earlier-stage processing devices to later-stage processing devices, is passed through the final-stage processing device 30Z, is transmitted to the transmission line 50, and is supplied to the signal conversion device 20. Namely, in the communication system 1A according to the present exemplary embodiment, the transmission direction of the command given by the control device 10 is the same as the transmission direction of the read data that has been acquired in accordance with the command.

Figure 4:
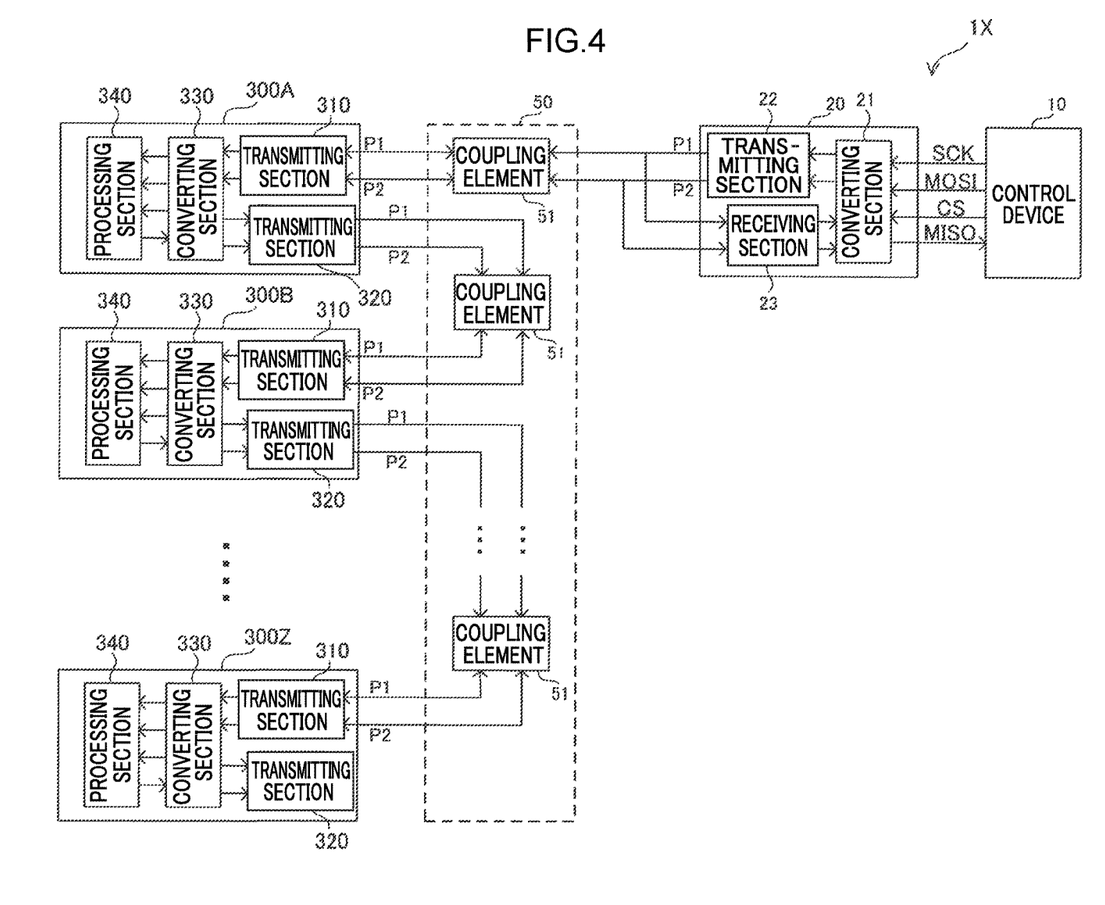
FIG. 4 is a block diagram illustrating configuration of a communication system according to a comparative example.

FIG. 4 is a block diagram illustrating configuration of a communication system 1X according to a comparative example. In the communication system 1X, processing devices 300A to 300Z include transmitting sections 310, 320 that have the functionality of both the receiving section 31 and the transmitting section 32 of the processing devices 30A to 30Z according to the above exemplary embodiment. Converting sections 330 and processing sections 340 have equal functionality to the converting sections 33 and the processing sections 34 of the processing devices 30A to 30Z according to the above exemplary embodiment of the present disclosure. In the communication system 1X according to the comparative example, only the first-stage processing device 300A is connected to the signal conversion device 20 through the transmission line 50.

In the communication system 1X according to the comparative example, pulse signals that include a command given by the control device 10 are transmitted along one direction going from earlier-stage processing devices to later-stage processing devices, similarly to in the communication system 1A according to the above exemplary embodiment. In contrast, in the communication system 1X, read data acquired by one of the processing devices 300A to 300Z in accordance with the command given by the control device 10 is transmitted along one direction going from later-stage processing devices to earlier-stage processing devices, is passed through the first-stage processing device 300A, is transmitted to the transmission line 50, and is supplied to the signal conversion device 20. Namely, in the communication system 1X according to the comparative example, the transmission direction of the command given by the control device 10 is opposite to the transmission direction of read data that has been acquired in accordance with the command.

In the communication system 1X according to the comparative example, a maximum value Td of a delay time from when pulse signals that include a command are given by the signal conversion device 20 until read data that has been acquired in accordance with the command reaches the signal conversion device 20 is expressed by Equation (1) below, wherein N is the number of stages of processing devices.

$$Td=2\times\{Tdms+(Tds+Tdss)\times(N-1)\} \quad (1)$$

Here, Tdms denotes the time needed for (one way) signal transmission between the signal conversion device 20 and the processing device 300A, Tds denotes the time needed for all the various processing of the processing devices 300A to 300Z, and Tdss denotes the time needed for (one way) signal transmission between adjacent processing devices. Namely, in the communication system 1X according to the comparative example, a time Tdms+(Tds+Tdss)×(N−1) is required for the command to be relayed to the final-stage processing device 300Z, and an additional time Tdms+(Tds+Tdss)×(N−1) is required for the read data acquired by the final-stage processing device 300Z to be relayed to the signal conversion device 20.

However, in the communication system 1A according to the above exemplary embodiment of the present disclosure, a maximum value Td of a delay time from when pulse signals that include a command are given by the signal conversion device 20 until read data that has been acquired in accordance with the command reaches the signal conversion device 20 is expressed by Equation (2) below, wherein N is the number of stages of processing devices.

$$Td=2\times Tdms+(Tds+Tdss)\times(N-1) \quad (2)$$

In the communication system 1A according to the present exemplary embodiment, since the transmission direction of the command given by the control device 10 is the same direction as the transmission direction of the read data that has been acquired in accordance with the command, the maximum value Td of the delay time from when pulse signals that include a command are given by the signal conversion device 20 until read data reaches the signal conversion device 20 may be made smaller than in the communication system 1X according to the comparative example.

Moreover, in the communication system 1X according to the comparative example, since a transmitting section 32 is not necessary in the final-stage processing device 300Z, it is desirable to halt the function of the transmitting section 32 of the final-stage processing device 300Z in order to suppress power consumption. To achieve this, each of the processing devices 300A to 300Z needs to include functionality for determining whether or not the respective processing device 300A to 300Z is itself the final-stage processing device, which may lead to an increase in cost. However, in the communication system 1A according to the present exemplary embodiment, each of the processing devices 30A to 30Z does not need to include functionality for determining whether or not the respective processing device 30A to 30Z is itself the final-stage processing device.

Moreover, similarly to the communication system 1 according to the first exemplary embodiment, the communication system 1A according to the above exemplary embodiment may reduce the effect of signal degradation in the transmission line.

Here, designation information designating a target for executing a command, from out of the processing devices 30A to 30Z, can be put in the MOSI signal of an SPI signal. The designation information can be put into the first pulse train P1 and the second pulse train P2 by the signal conversion device 20 as pulses that are different from the successive pulses corresponding to the chip select signal CS. In such cases, the designation information may also be put in the successive pulses corresponding to the chip select signal CS. For example, a target for executing a command, from out of the processing devices 30A to 30Z, may be specified by the number of pulses in the successive pulses corresponding to the chip select signal CS. For example, the number of pulses in the successive pulses corresponding to the chip select signal CS may be set to two when designating the processing device 30A as the target for executing a command, and the number of pulses in the successive pulses corresponding to the chip select signal CS may be set to three when designating the processing device 30B as the target for executing a command. By thus putting designation information designating a target for executing a command in the first pulse train P1 and the second pulse train P2, both in successive pulses corresponding to the chip select signal CS and in portions other than the successive pulses, the risk of mistaken recognition of designation information by the processing devices 30A to 30Z may be reduced.

Third Exemplary Embodiment

Figure 5:
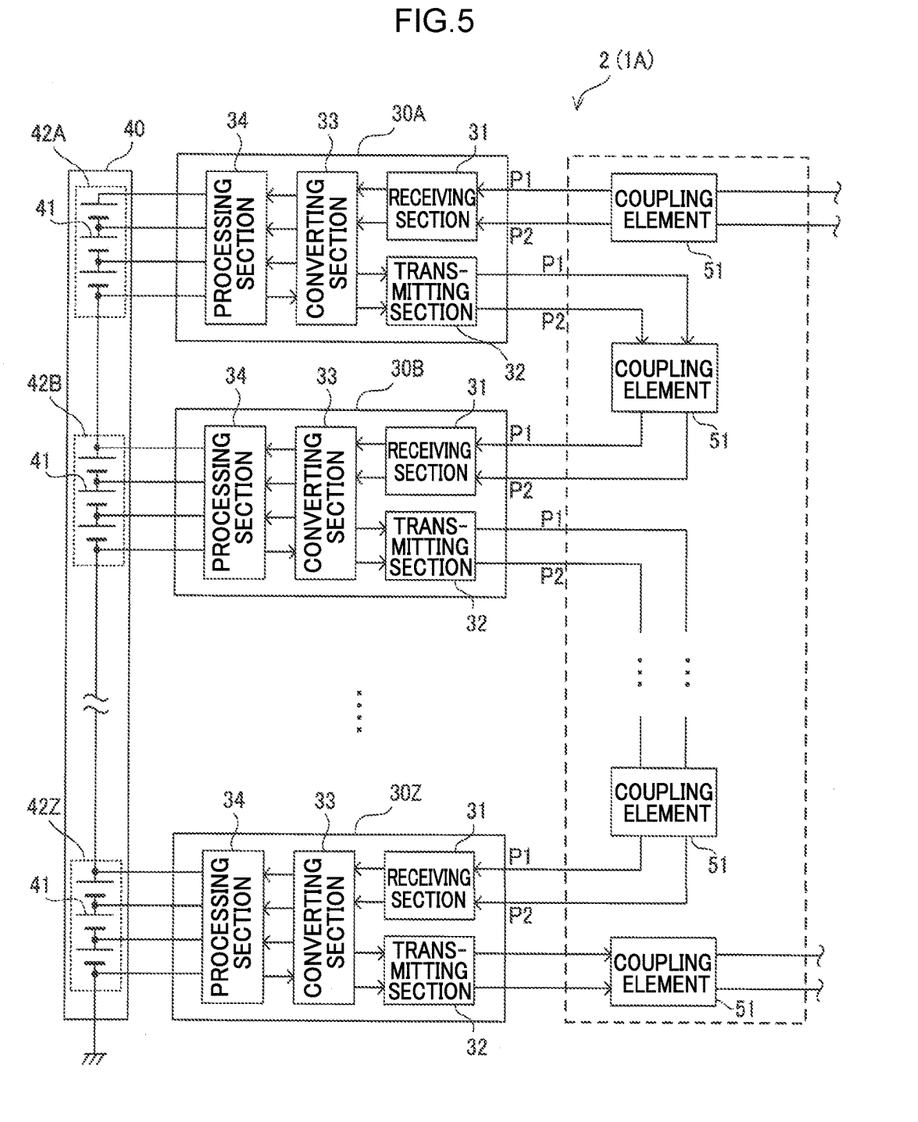
FIG. 5 is a diagram illustrating configuration of a battery monitoring system according to an exemplary embodiment of the present disclosure.

FIG. 5 is a diagram illustrating configuration of a battery monitoring system 2 according to an exemplary embodiment of the present disclosure that employs the communication system 1A according to the second exemplary embodiment above. The battery monitoring system 2 is a system that monitors the state of each battery cell 41 of an assembled battery 40 that includes plural battery cells 41 connected in series. Note that in FIG. 5, the control device 10 and the signal conversion device 20 are omitted from illustration.

The plural battery cells 41 are divided into groups such that each group is distinct and includes, for example, three battery cells, thus forming battery cell groups 42A, 42B, . . . , 42Z. The first-stage processing device 30A is provided corresponding to the battery cell group 42A having the highest electric potential, and monitors the state of each battery cell 41 included in the battery cell group 42A. The processing device 30B is provided corresponding to the battery cell group 42B, and monitors the state of each battery cell 41 included in the battery cell group 42B. The processing device 30Z is provided corresponding to the battery cell group 42Z having the lowest electric potential, and monitors the state of each battery cell 41 included in the battery cell group 42Z. Note that the number of battery cells 41 subject to monitoring by the processing devices 30A to 30Z may be increased or decreased as appropriate.

Figure 6:
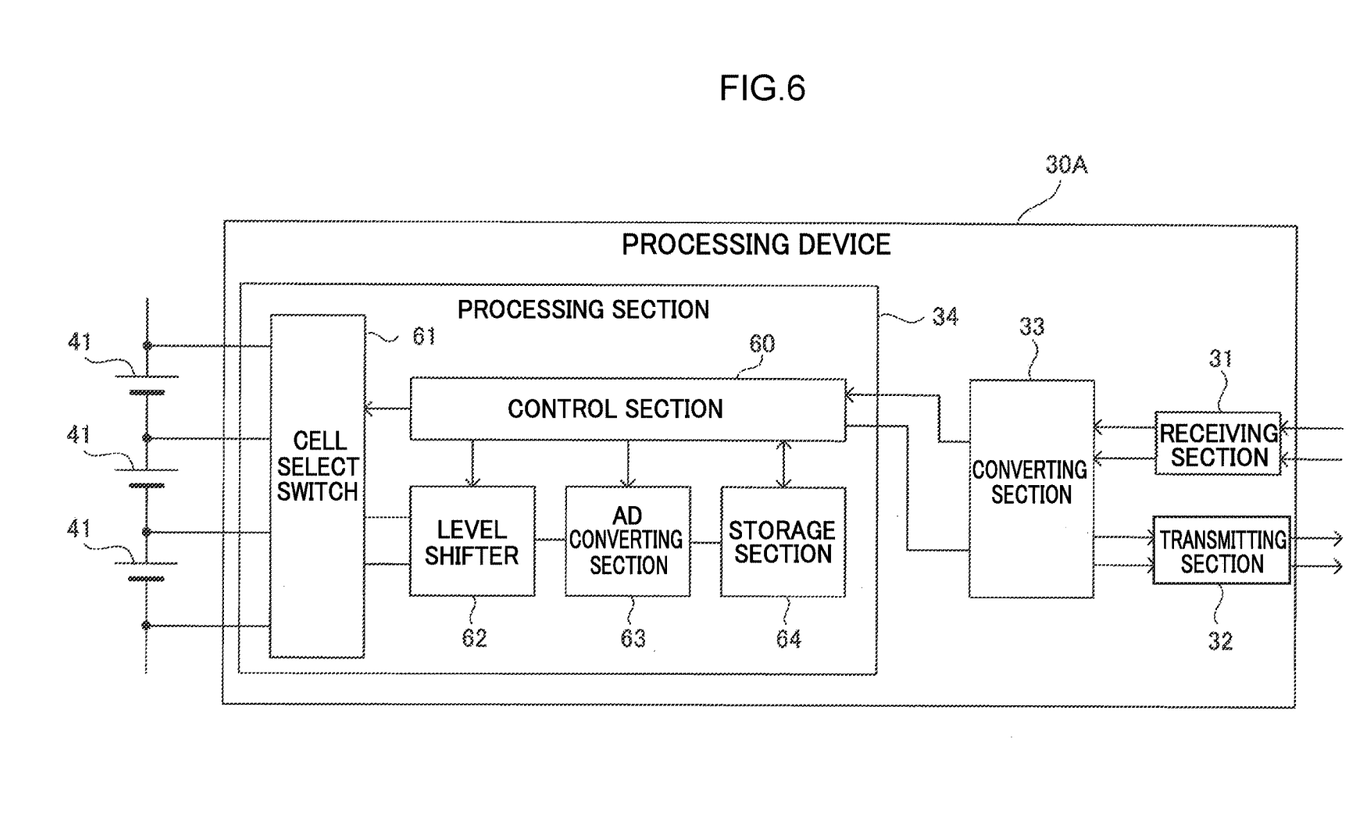
FIG. 6 is a block diagram illustrating configuration of a processing device according to an exemplary embodiment of the present disclosure.

FIG. 6 is a block diagram illustrating a configuration of the processing device 30A. Note that the configuration of the processing devices 30B to 30Z is similar to that of the processing device 30A. The processing section 34 of the processing device 30A includes a control section 60, a cell select switch 61, a level shifter 62, an AD converting section 63, and a storage section 64.

In accordance with a control signal supplied from the control section 60, the cell select switch 61 selects one of the battery cells 41 subject to its monitoring, and outputs the voltage between the positive electrode and negative electrode of the selected battery cell. The level shifter 62 outputs a cell voltage, this being the difference between the positive electrode potential and the negative electrode potential of the battery cell 41 selected by the cell select switch 61, having a level with a reference to a ground potential. The AD converting section 63 outputs a digital value that accords with the cell voltage output from the level shifter 62. The storage section 64 is a storage medium for saving the digital value of the cell voltage output from the AD converting section 63.

The control section 60 controls the cell select switch 61, the level shifter 62, the AD converting section 63, and the storage section 64 in accordance with a command that has been included in the data signal MOSI obtained through conversion processing using the converting section 33.

Explanation follows regarding a case in which the control device 10 (see FIG. 3) gives a command directing, for example, the processing device 30B to read a cell voltage data. The command given by the control device 10 is converted into pulse signals by the signal conversion device 20 (see FIG. 3) and the pulse signals are supplied to the first-stage processing device 30A through the transmission line 50. The command is transmitted from the first-stage processing device 30A to the later-stage processing device 30B, and is further transmitted from the later-stage processing device 30B to a later-stage processing device. The command is sequentially transmitted to the final-stage processing device 30Z.

In a case in which the processing device 30B recognizes that it itself has been designated by designation information put in the command in the MOSI signal, which has been obtained through conversion processing in the converting section 33, the processing device 30B reads the cell voltage data saved in the storage section 64 of the processing device 30B. After converting the data that has been read into pulse signals in the converting section 33, the processing device 30B transmits the data that has been read from the transmitting section 32.

The read data that has been read from the storage section of the processing device 30B is sequentially transmitted to later-stage processing devices, and reaches the final-stage processing device 30Z. The final-stage processing device 30Z transmits, from its own transmitting section 32, the read data indicating the cell voltage that was read by the processing device 30B. The read data transmitted from the transmitting section 32 of the final-stage processing device 30Z is received by the receiving section 23 of the signal conversion device 20 through the transmission line 50. The converting section 21 of the signal conversion device 20 converts the format of the read data that has been received from the pulse signal format into the SPI signal format. The converting section 21 of the signal conversion device 20 supplies the MISO signal that includes the read data obtained through conversion processing to the control device 10.

Similarly to the communication system according to the first and second exemplary embodiments, the battery monitoring system 2 according to the present exemplary embodiment may reduce the effect of signal degradation in the transmission line. Moreover, the maximum value Td of a delay time from when pulse signals that include a command are given by the signal conversion device 20 until read data reaches the signal conversion device 20 may be made smaller than in the communication system 1X according to the comparative example.

In cases in which the communication system 1X according to the comparative example illustrated in FIG. 4 is used as a battery monitoring system, the read data is transmitted in a direction going from later-stage processing devices toward earlier-stage processing devices. Accordingly, before transmitting the read data to earlier-stage processing devices, later-stage processing devices need to boost the level of signals including the read data to a signal level in which the earlier-stage processing devices are able to handle. Thus, in cases in which the communication system 1X according to the comparative example is used as a battery monitoring system, each of the processing devices 300A to 300Z needs to include a boosting circuit, which may lead to an increase in cost. However, in the battery monitoring system 2 according to the present exemplary embodiment, the transmission direction of a command given by the control device 10 and the transmission direction of read data that has been acquired in accordance with the command are only in the direction going from earlier-stage processing devices to later-stage processing devices. Thus, the processing devices 30A to 30Z do not need a boosting circuit.

Note that in the present exemplary embodiment, although an example has been given of a case in which the processing devices 30A to 30Z measure a cell voltage of the battery cells 41, the processing devices 30A to 30Z may measure a temperature of the battery cells 41.

What is claimed is:

1. A signal conversion device comprising:
    a first converting section configured to convert a clock signal input through a first signal line, a data signal input through a second signal line, and a control signal input through a third signal line, into a first pulse train and a second pulse train; and
    a transmitting section configured to transmit the first pulse train through a fourth signal line and the second pulse train through a fifth signal line.

2. The signal conversion device of claim 1, wherein the first converting section is configured to put pulses into the first pulse train and the second pulse train based on a level of the data signal at a timing of a level transition in the clock signal.

3. The signal conversion device of claim 2, wherein the first converting section:
    puts one pulse into the first pulse train and then puts one pulse into the second pulse train in a case in which the data signal is at a high level at a timing of a rising level transition in the clock signal, and puts one pulse into the second pulse train and then puts one pulse into the first pulse train in a case in which the data signal is at a low level at the timing of the rising level transition in the clock signal.

4. The signal conversion device of claim 2, wherein:

the control signal is a signal that, through a level transition, causes a control target device to switch between an active state and an inactive state, and the first converting section is configured to put successive pulses into at least one of the first pulse train or the second pulse train in response to the level transition of the control signal.

5. The signal conversion device of claim 4, wherein:

the first converting section is configured to put successive pulses into one of the first pulse train or the second pulse train in response to a rising level transition of the control signal; and the first converting section is configured put successive pulses into an other of the first pulse train or the second pulse train in response to a falling level transition of the control signal.

6. The signal conversion device of claim 4, wherein the first converting section is configured to put first successive pulses into one of the first pulse train or the second pulse train in response to the level transition of the control signal, and after the first successive pulses, the first converting section puts second successive pulses into an other of the first pulse train or the second pulse train.

7. The signal conversion device of claim 4, wherein a pulse width of the pulses put into the first pulse train and the second pulse train based on the level of the data signal at a timing of a level transition in the clock signal and a pulse width of each pulse of the successive pulses are the same.

8. The signal conversion device of claim 4, wherein the first pulse train and the second pulse train include designation information that designates one of a plurality of the control target devices.

9. A processing device comprising:

a receiving section configured to receive the first pulse train and the second pulse train transmitted from the signal conversion device of claim 1;

a second converting section configured to convert the first pulse train and the second pulse train to the clock signal, the data signal, and the control signal; and a processing section configured to perform predetermined processing based on the clock signal, the data signal, and the control signal.

10. The processing device of claim 9, further comprising a transmitting section configured to transmit the first pulse train and the second pulse train received by the receiving section.

11. The processing device of claim 10, wherein, in a case in which a command included in the data signal is to read data, the second converting section converts data obtained by the predetermined processing of the processing section into the first pulse train and the second pulse train, and transmits via the transmitting section.

12. The processing device of claim 9, wherein the processing section measures a cell voltage of a battery cell as the predetermined processing.

13. A signal conversion method comprising:

converting a clock signal input through a first signal line, a data signal input through a second signal line, and a control signal input through a third signal line into a first pulse train and a second pulse train.

14. The signal conversion method of claim 13, wherein the conversion is performed by putting pulses into the first pulse train and the second pulse train based on a level of the data signal at a timing of a level transition in the clock signal.

15. The signal conversion method of claim 13, wherein:

the control signal is a signal that, through a level transition, causes a control target device to switch between an active state and an inactive state; and successive pulses are put into at least one of the first pulse train or the second pulse train in response to the level transition of the control signal.

* * * * *